July 4, 1967

C. E. LENZ 3,329,895

DIGITAL PHASE COMPARATOR CAPABLE OF INDICATING
GREATER THAN 360 DEGREE PHASE DIFFERENCES

Filed July 2, 1964

INVENTOR.
CHARLES E. LENZ

BY *Vincent N Cleary*

ATTORNEY

July 4, 1967

C. E. LENZ 3,329,895

DIGITAL PHASE COMPARATOR CAPABLE OF INDICATING
GREATER THAN 360 DEGREE PHASE DIFFERENCES

Filed July 2, 1964

FIG. 2(a) PRIMARY CLOCK $C_1$

FIG. 2(b) INPUT $e_i$ OF PHASE $\phi_i(t)$

FIG. 2(c) PHASE ANGLE $\phi_i(t)$

FIG. 2(d) INPUT $e_o$ OF PHASE $\phi_o(t)$

FIG. 2(e) PHASE ANGLE $\phi_o(t)$

FIG. 2(f) CONVERTER OUTPUT $e_p$ (VOLTS)

TYPICAL BINARY STEP COUNT

*INVENTOR.*
CHARLES E. LENZ

BY

ATTORNEY

FIG. 5

INVENTOR.
CHARLES E. LENZ
BY Vincent N Cleary
ATTORNEY

C. E. LENZ

3,329,895

DIGITAL PHASE COMPARATOR CAPABLE OF INDICATING
GREATER THAN 360 DEGREE PHASE DIFFERENCES

Filed July 2, 1964

INVENTOR.
CHARLES E. LENZ

BY

AGENT

United States Patent Office 3,329,895
Patented July 4, 1967

3,329,895
DIGITAL PHASE COMPARATOR CAPABLE OF INDICATING GREATER THAN 360 DEGREE PHASE DIFFERENCES
Charles E. Lenz, Fullerton, Calif., assignor to North American Aviation, Inc.
Filed July 2, 1964, Ser. No. 379,997
10 Claims. (Cl. 324—83)

This invention relates to a phase comparator and more specifically to a digital phase comparator having an output which varies as a function of the difference in phase between two periodic input functions.

One application of a phase comparator is demodulation of a phase-modulated signal by comparison of its phase with that of a carrier of fixed frequency. A common method of performing such demodulation is with a phase detector incorporating an inductance-capacitance circuit tuned to the fixed carried frequency. In such a state-of-the-art phase detector, the output voltage corresponding to a given phase shift will vary if the resonant frequency of the tuned circuit used drifts. Such drift may result from such cases as environmental variation and component aging. In addition, a conventional phase detector has a monotonically varying output only for phase angles within a range of ±90 degrees. Beyond this range, the output of a conventional phase detector decreases as the absolute value of the phase shift increases. Further, the linearity of such a detector becomes progressively poorer as the phase difference departs from the value yielding zero output voltage. A further characteristic of a conventional detector is that it must be tuned to the reference frequency. Consequently, any variation of the reference frequency will cause a bias to appear in the phase-detector output.

Accordingly, an object of the present invention is to provide a phase detector wherein the output for a given phase difference remains constant.

Another object of the invention is the provision of a phase detector which will provide a monotonically varying output over a range of phase angles exceeding 360° in absolute value.

Still another object of the invention is to provide a digital phase detector which operates with a linearity independent of the phase difference measured.

A feature of the present invention includes a phase comparator for measuring the phase difference between a first and a second periodically varying signals including a digital counter which counts the cycles of the first signal in one direction and counts the cycles of the second signal in the opposite direction. The counter is then employed to give an output signal which varies as a function of the difference in phase of the two signals.

These and other objects, features and advantages of the present invention will become apparent from the following detailed description taken together with the accompanying drawing in which:

FIGS. 4(a)–4(l) illustrate waveforms useful in explaining the invention;

FIGS. 9(a)–9(f) illustrate waveforms useful in explaining the invention; and

FIGS. 10(a)–10(f) illustrate additional waveforms useful in explaining the invention.

Figures 1, 3:
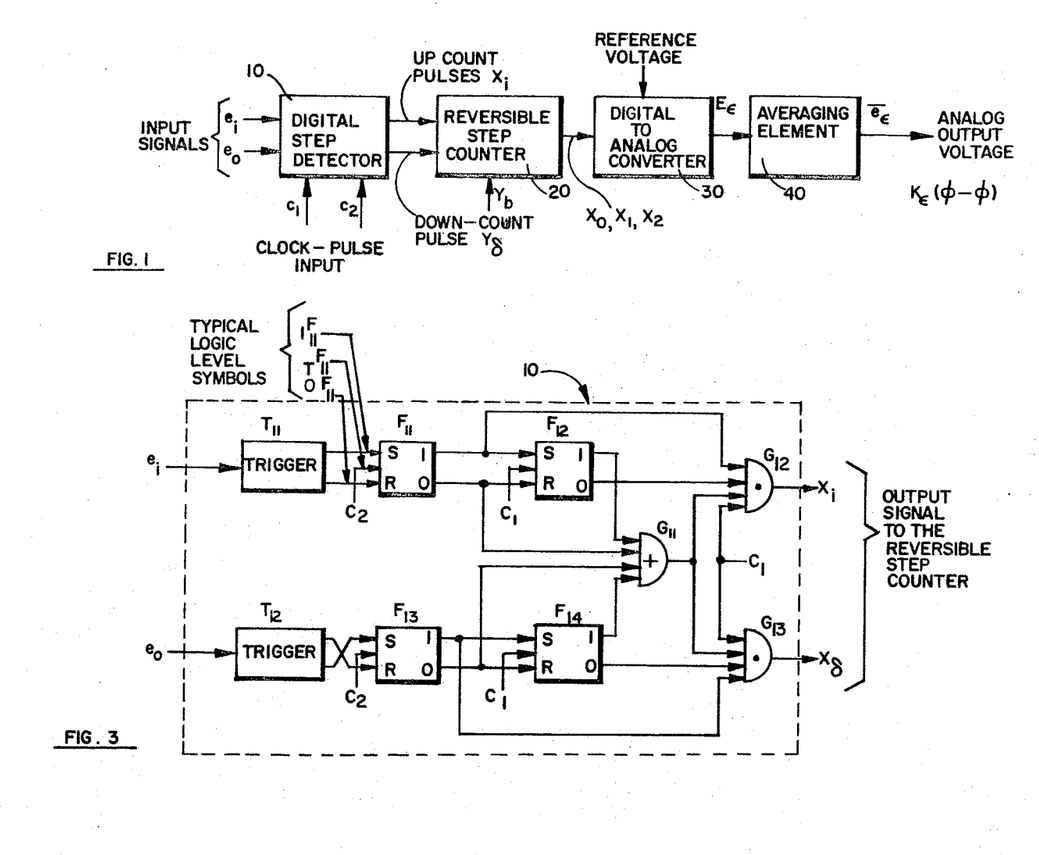
FIG. 1 illustrates a schematic diagram in block form of a phase comparator embodying the invention.
FIG. 3 illustrates a schematic diagram in block form of the digital step detector illustrated in FIG. 1.
Figures 4A, 4L:
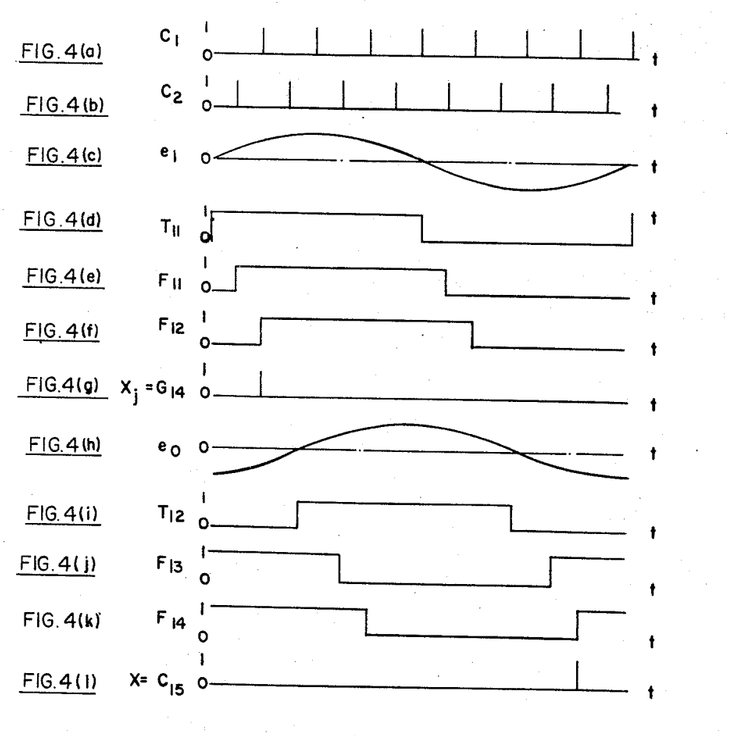

A block diagram of the digital phase comparator embodying the invention is shown in FIG. 1. The input signals $e_i$ and $e_o$ are commonly sinusoidal or square waves and of the same frequency in the steady state. These two voltages need not, however, have the same waveforms. A primary clock signal $C_1$ having a repetition rate harmonically related to the steady-state frequency of $e_i$ and $e_o$ is employed. The secondary clock signal $C_2$ is of the same repetition rate as $C_1$, but is displaced 180 electrical degrees from $C_1$ at the clock frequency as shown in FIGS. 4(a) and (b). The quantized analog output voltage $\overline{ee}$ is directly proportional to the phase displacement of input $e_1$ relative to input $e_2$ over a specified range about zero phase displacement.

The digital phase comparator is comprised of the basic components listed below, along with a description of the functions of each:

Digital step detector

Figures 2A, 2B:
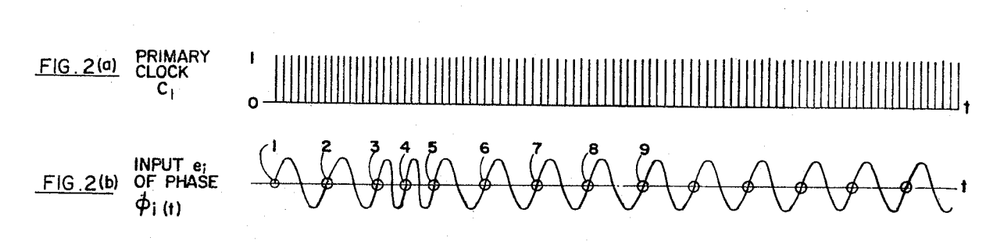
FIGS. 2(a)–2(f) illustrate waveforms and curves useful in explaining the invention.
Figure 2C:
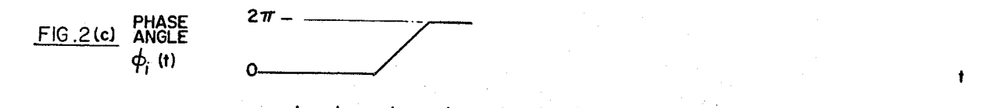
Figure 2D:
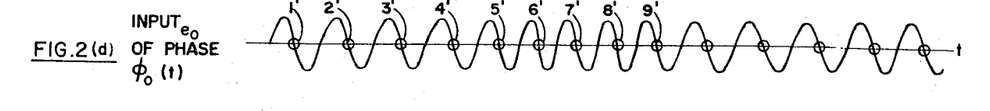

The purpose of the step detector 10 is to emit an up-count pulse to the reversible step counter in response to each positive step of input $e_1$ and to emit a down-count pulse to that counter in response to each negative step of input $e_o$. When either input signal, or both input signals, are sinusoidal, positive and negative slope zero crossings are interpreted as positive and negative steps, respectively. More specifically, when $e_1$ has a negative to positive zero crossing, circled in FIG. 2(b), an up-count pulse will be emitted from step detector 10. When a positive to negative zero crossing occurs in $e_o$, as circled in FIG. 2(d), a down-count pulse will be emitted from detector 10. In each case, the pulse emitted will be from clock train $C_1$. Output pulses will be emitted as soon as possible consistent with logic provisions necessary to assure that no truncated clock pulses will be sent to the reversible step counter. In cases where the instantaneous phase displacement would cause count-up and count-down pulses to be emitted simultaneously, both pulses are inhibited.

Reversible step counter

The purpose of the reversible step counter 20 is to keep a continuous tally of the total number of positive $e_1$ steps which have occurred minus the total number of negative $e_o$ steps which have occurred. In counting down one from 000 (in the case of a three-bit counter to be used as an example), the counter will recycle to 111. Thus the most significant bit represents the sign and is 1 only for negative numbers. The magnitude of negative numbers is represented in one's complement form.

The initial condition of the step counter is established by a preset pulse $Y_b$ applied to all counter flip-flops. Each flip-flop is designed so that this pulse disables all other inputs which the flip-flop may receive during its duration. If the preset pulse sets the counter to zero, if $$-\pi < \phi_0 - \phi_1 < \pi \tag{1}$$

where $\phi_1$ and $\phi_0$ are the phase angles of $e_1$ and $e_o$, respectively, and if the preset pulse and an up-count pulse from the step detector terminate simultaneously, the digital phase comparator will be in proper operation. Other sets of initial conditions are also possible, of course.

The capacity of the reversible step counter must be adequate to accommodate the entire range of phase displacement possible. Each count corresponds to $2\pi$ radians of phase displacement. The step counter may be designed to count discontinuously for cyclic representation of phase displacement.

Digital to analog converter

The purpose of the digital-to-analog converter 30 is to produce an instantaneous output voltage proportional to the contents of the reversible step counter, but biased positively by a voltage one-half that corresponding to a single count. An example of a digital-to-analog converter operating with a three-bit step counter is shown in the table below.

OPERATION OF THREE-BIT DIGITAL-TO-ANALOG CONVERTER

| Equivalent Decimal Count $(C_\epsilon)_{10}$ | Step-Count Coefficients | | | Output Voltage $(E_\epsilon)_{10}$ |
|---|---|---|---|---|
| | $a_2$ | $a_1$ | $a_0$ | |
| 3 | 0 | 1 | 1 | $\frac{7}{2}$ |
| 2 | 0 | 1 | 0 | $\frac{5}{2}$ |
| 1 | 0 | 0 | 1 | $\frac{3}{2}$ |
| 0 | 0 | 0 | 0 | $\frac{1}{2}$ |
| 7 | 1 | 1 | 1 | $-\frac{1}{2}$ |
| 6 | 1 | 1 | 0 | $-\frac{3}{2}$ |
| 5 | 1 | 0 | 1 | $-\frac{5}{2}$ |
| 4 | 1 | 0 | 0 | $-\frac{7}{2}$ |
| | $-(2^2)$ | $2^1$ | $2^0$ | |
| | Bit Weight | | | |

More generally, if an $m$-bit error counter is used, where $m>1$, then the step count may be written $$C_\epsilon \sum_{k=0}^{m-1} a_k 2^k, \quad a_k = 0, 1 \quad (2)$$

The output $E_\epsilon$ from the digital-to-analog converter will then be $$-k_\mathrm{p}\left(2^{m-1}-\frac{1}{2}\right) \leq E_\epsilon = k_\mathrm{p}\left(\sum_{k=0}^{m-2} a_k 2^k - a_{m-1} 2^{m-1} + \frac{1}{2}\right) \leq k_\mathrm{p}\left(2^{m-1}-\frac{1}{2}\right) \quad (3)$$

where $k_\mathrm{p}$ is a constant of dimension volts. Note that the most significant, or sign, bit is weighted negatively. In the table above, $k_\mathrm{p}=1$ volt.

Averaging element

The purpose of the averaging element 40 is to smooth the output of the digital-to-analog converter by averaging over a period of time optimum in respect both to the accuracy with which the average is represented and to the time delay introduced. By smoothing the output of digital-to-analog converter 30 to obtain the average or mean value thereof as a function of time, a voltage is obtained which is directly proportional to the instantaneous phase difference between $e_1$ and $e_0$. One circuit suitable in many cases is a resistance-capacitance network having the transfer function $$G_a(s) = \frac{1}{\tau s + 1} \quad (4)$$

where $\tau$ is a time constant of dimension seconds.

Figures 2E, 2F:
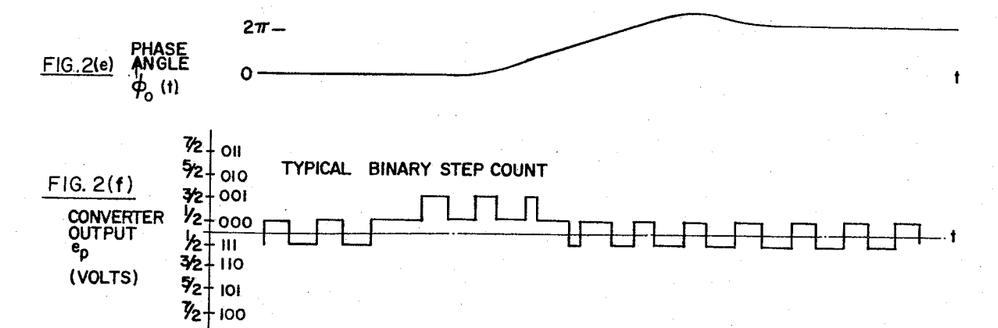

Typical operation of the digital phase comparator is illustrated by the voltage and phase relations in FIGS. 2(a)–2(f). The primary clock train $C_1$ appears in FIG. 2(a). The input signals $e_1$ and $e_0$ shown in FIGS. 2(b) and 2(d), respectively, are both sinusoidal voltages in this case, having steady-state frequencies one-eighth of the clock rate. Each positive-slope zero crossing of $e_1$ is converted to a positive step by the digital step detector 10, which then causes the reversible step counter 20 to count up one. Each negative-slope zero crossing of $e_0$ is similarly converted to a negative step by the digital step detector 10, which then causes the reversible step counter 20 to count down one in the manner previously described. Operation of the step counter and the corresponding output voltage $E_\epsilon$ from the digital-to-analog converter are shown by FIG. 2(f). The phase angles of $e_1$ and $e_0$, designated $\phi_1$ and $\phi_0$, respectively, are plotted in FIGS. 2(c) and 2(e). The initial average value of $E_\epsilon$ is shown to be 0. However, an increase of $2\pi$ radians in $\phi_1$ while $\phi_0$ remains fixed causes a corresponding increase in the average value of $E_\epsilon$. Subsequently, the phase angle $\phi_0$ is also shown in increase from 0 to 2 radians; at this time, the average value of $E_\epsilon$ returns to zero, corresponding to the zero difference in phase between $e_1$ and $e_0$. The waveforms shown are typical of a servomechanism utilizing the digital phase comparator as an error detector. In such a case, $e_1$ would correspond to the input command generated by a phase encoder, and $e_0$ would correspond to the voltage furnished by a phase-encoding transducer attached to the output shaft.

Operation of each of the basic components described in the preceding section will now be discussed in detail. Two types of reversible step counters will be considered: The first type causes an average output voltage $\bar{e}_\epsilon$ to be generated which is directly proportional to the phase difference $\phi_1-\phi_0$ over the entire permissible range of this difference, while the second type causes an average output voltage $\bar{e}_\epsilon$ to be generated which is a piecewise linear function of $\phi_1-\phi_0$ when that difference is defined as a cyclic variable of period $2\pi n$, where $n$ is a positive integer.

Step detector (10)

The logic diagram of the step detector 10 is shown in FIG. 3. Inputs $e_1$ and $e_0$ may be either sine or square waves of equal steady-state frequencies to which the clock repetition rate is harmonically related. The purpose of the step detector is to emit an up-count pulse at $X_1$ soon after each positive step or positive-slope zero crossing of $e_1$ and to emit a down-count pulse at $X_5$ soon after each negative step or negative-slope zero crossing of $E_0$. Pulses appearing at $X_1$ and $X_5$ are selected from clock-train $C_1$ by the step detector; however, if the phase relationship between $e_1$ and $e_0$ is such as to cause pulses to be emitted simultaneously at $X_1$ and $X_5$, both such simultaneous pulses will be inhibited.

A more detailed description of the above components is provided below. The electrical condition of the triggers and flip-flops will be described as "true" or "false." If the trigger or flip-flop is described as in a true condition, this means that the upper of the two outputs is "one" and the lower output is "zero." Hence, the flip-flops $F_{11}$, $F_{12}$, $F_{13}$ and $F_{14}$ are all illustrated in a true state in FIG. 3. If the trigger or flip-flop is described as false, this means the upper output is zero and the lower output one.

The triggers $T_{11}$ and $T_{12}$ (FIG. 3) are of the type (such as Schmidt triggers) that if the input goes negative to positive the output will be switched to a true output or condition. Hence, the positive going zero crossings of $\phi_1$, shown in FIG. 2(a) will switch $T_{11}$ into a true state. If the input of triggers $T_{11}$ and $T_{12}$ goes from positive to negative, the output will be switched from a true to a false condition.

When operating from sinusoidal inputs, triggers $T_{11}$ and $T_{12}$ are adusted to provide true outputs if, and only if, the signs of their respective input voltages are positive. When operating from square-wave inputs, a voltage level is chosen which is the steady-state average value of $e_1$ or $e_0$, respectively. Triggers $T_{11}$ and $T_{12}$ are then adusted to assume true states if, and only if, the instantaneous values of their input voltages are greater than $E_{1a}$ and $E_{2a}$, respectively.

Flip-flops $F_{11}$, $F_{12}$, $F_{13}$ and $F_{14}$ of the step detector 10 are clocked R–S storage flip flops. If a one is at the R input and a zero at the S input, these flip flops will be switched to or maintained in a false condition when the next clock pulse arrives at the flip flop. If a zero is at the R input and a one at the S input, these flip flops will be switched to or maintained in a true condition when the next lcock pulse arrives at the flip-flop.

Figure 5:
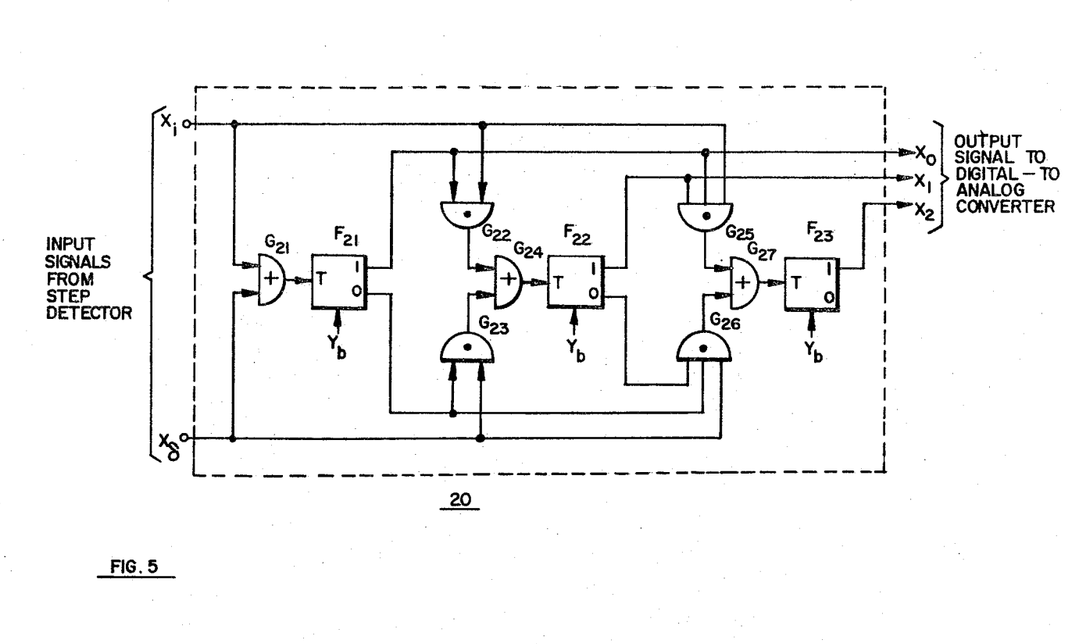
FIG. 5 illustrates a step counter which can be employed in the comparator illustrated in FIG. 1.
Figure 7:
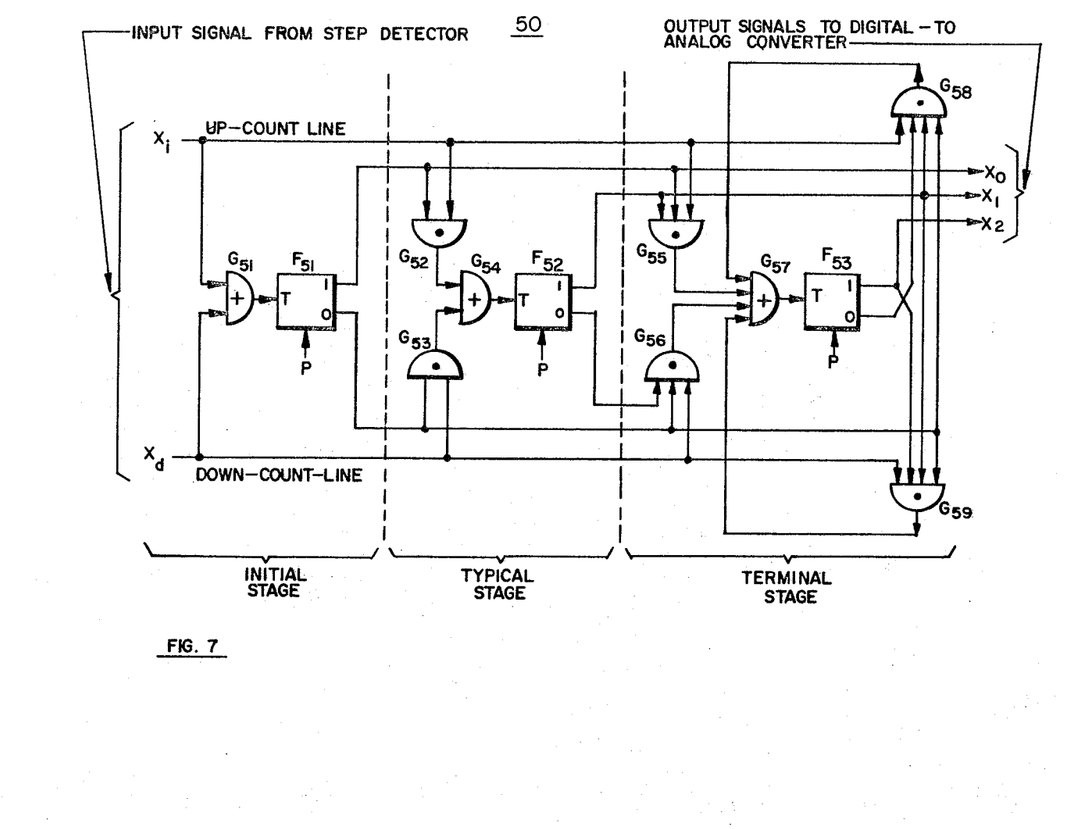
FIG. 7 illustrates another step counter which can be employed in the comparator illustrated in FIG. 1.

The flip flops $F_{21}$, $F_{22}$, $F_{23}$, $F_{51}$, $F_{52}$ and $F_{53}$ in FIGS. 5 and 7 are simple T flip flops which change state from either true to false or false to true when a clock pulse is applied to the input. In using these flip flops in the counters illustrated in FIGS. 5 and 7 either leading or trailing edge triggering can be employed. If leading edge triggering is employed an inherent delay (in changing states) of slightly more than the time width of the clock pulse is necessary in the flip flop. If trailing edge triggering is employed, this delay can be less than the clock pulse time width.

Returning now to FIG. 3, when trigger $T_{11}$ changes state, flip-flop $F_{11}$ will assume the same state at the time of the next $C_2$ pulse. When flip-flop $F_{11}$ changes state, flip-flop $F_{12}$ will assume the same state at the time of the next $C_1$ pulse. In normal operation, if, and only if, $F_{11}$ is true and $F_{12}$ is false at the time of a $C_1$ pulse, will that $C_1$ pulse be emitted at $X_1$. This situation exists only for one-half clock period following the first $C_2$ pulse after $T_{11}$ goes true. The logic arrangement shown makes it impossible for a truncated clock pulse to be emitted at $X_1$ and possibly cause improper operation of the step counter, regardless of the time at which $T_{11}$ goes true.

In a manner similar to that just described, trigger $T_{12}$ and flip-flops $F_{13}$ and $F_{14}$ act in response to input signal $e_o$ to provide down-count pulses at $X_6$. A difference exists, however, in the relationship between trigger $T_{12}$ and flip-flop $F_{13}$. At the next $C_2$ pulse after trigger $T_{12}$ changes state, flip-flop $F_{13}$ assumes the complement of that state. Thus, the first $C_1$ pulse following the first $C_2$ pulse after $T_{12}$ goes true will be emitted at $X_6$.

Or gate $G_{11}$ is provided to prevent pulses from being emitted simultaneously at $X_1$ and $X_6$ and thereby causing improper operation of the step counter. Immediately prior to the impending emission of such simultaneous pulses upon occurrence of the next $C_1$ pulse, both $F_{11}$ and $F_{13}$ will be true, and both $F_{12}$ and $F_{14}$ will be false, thereby providing no true input to or-gate $G_{11}$. This situation will exist under no condition other than that stated. Consequently, and-gates $G_{12}$ and $G_{13}$ will be inhibited for the next $C_1$ pulse, and no pulse will be emitted at either $X_1$ or $X_6$.

The logic equations which govern the operation of the digital step detector are listed below. Typical logic level symbols employed in these equations are illustrated in FIG. 3. As shown in FIG. 3, $_1F_{11}$ is to the S (or set) input to flip-flop $F_{11}$. $_TF_{11}$ is the clock input to $F_{11}$ and $_0F_{11}$ is the R (or reset) input to $F_{11}$. Corresponding symbols are employed for the inputs of other stages where 1 indicates the S or set input, T the clock input and 0 the R or reset input. The upper output of each block is indicated by the block designator. That is, the upper output of flip-flop $F_{11}$ is indicated as $F_{11}$ whereas the lower output (shown as zero in FIG. 3) is indicated as $\overline{F}_{11}$. Similar symbols are employed below for the other stages. These output symbols are also employed in FIGS. 4(a)-4(l).

$$_1F_{11}=T_{11} \quad (5a)$$
$$_TF_{11}'=C_2 \quad \text{Flip-flop } F_{11} \text{ input equations} \quad (5b)$$
$$_0F_{11}=\overline{T}_{11} \quad (5c)$$
$$_1F_{12}=F_{11} \quad (6a)$$
$$_TF_{12}=C_1 \quad \text{Flip-flop } F_{12} \text{ input equations} \quad (6b)$$
$$_0F_{12}=\overline{F}_{11} \quad (6c)$$
$$_1F_{13}=\overline{T}_{12} \quad (7a)$$
$$_TF_{13}=C_2 \quad \text{Flip-flop } F_{13} \text{ input equations} \quad (7b)$$
$$_0F_{13}=T_{12} \quad (7c)$$
$$_1F_{14}=F_{13} \quad (8a)$$
$$_TF_{14}=C_1 \quad \text{Flip-flop } F_{14} \text{ input equations} \quad (8b)$$
$$_0F_{14}=\overline{F}_{13} \quad (8c)$$

$$G_{12}=X_1=C_1F_{11}\overline{F}_{12}G_{11} \quad (9)$$
$$\text{Output equations}$$
$$G_{13}=X_6=C_1F_{13}\overline{F}_{14}G_{11} \quad (10)$$
$$G_{11}=\overline{F}_{11}F_{12}\overline{F}_{13}F_{14} \quad (11)$$

$$T_{11}=\begin{cases} 1, e_i>0 \\ 0, e_i \leq 0 \end{cases} \text{Trigger } T_{11} \text{ equations} \quad \begin{matrix}(12a)\\(12b)\end{matrix}$$

$$T_{12}=\begin{cases} 1, e_o>0 \\ 0, e_o \leq 0 \end{cases} \text{Trigger } T_{12} \text{ equations} \quad \begin{matrix}(13a)\\(13b)\end{matrix}$$

Relations 12 and 13 apply only when $e_i$ and $e_o$ are sinusoidal. For square waves, the zeros shown may be replaced by the steady-state average value of the square wave.

Waveforms pertaining to the step detector 10 are shown in FIGS. 4(a)-4(l). Both inputs $e_i$ and $e_o$ were chosen to be sinusoidal for this example. In this particular case, the zero crossings of input $e_i$ are shown synchronized with pulses of clock train $C_1$, as might occur if $e_i$ were supplied by an input-command generator in a phase-comparison type servomechanism. When $e_i$ is so synchronized and $e_o$ is not, a phase tolerance corresponding to plus or minus one-half clock period occurs in the accuracy with which $\overline{e}_\epsilon$ represents the phase difference between $e_i$ and $e_o$. If both $e_i$ and $e_o$ are both unsynchronized, this tolerance becomes twice as great as the value stated. As previously discussed, either $e_i$ or $e_o$, or both, may be square waves if desired. In the example illustrated in FIGS. 4(a)-4(l), the flip-flops $F_{11}$ and $F_{12}$ are shown as initially being false (see FIGS. 4(e) and (f)) whereas $F_{13}$ and $F_{14}$ are shown to be true initially. It will be understood, however, that the detector will adjust itself and the initial condition of these flip flops is immaterial.

*Step counter*

The output from the step detector 10, $X_1$ and $X_6$ shown in FIGS. 4(g) and (l) is applied to a reversible step counter 20, shown in detail in FIG. 5. The reversible step counter 20 is binary weighted and functions to keep a continuous tally of the total number of positive $e_i$ steps (or positive-slope zero crossings) which have occurred minus the total number of negative $e_o$ steps (or negative-slope zero crossings) which have occurred. Two types of step counters are of interest. The first type maintains a count which varies monotonically with the phase difference $\phi_i-\phi_o$, while the second type maintains a count which varies cyclically with this phase difference. Examples of three-bit counters of each type will be given. In each of these counters, a negative number is indicated by a 1 in the most significant bit position, and negative numbers are represented in one's complement form.

*Counter for monotonically varying output $\overline{e}_\epsilon$ with phase difference*

The logic diagram of a three-bit reversible step counter for monotonically varying output $\overline{e}_\epsilon$ with phase difference $\phi_i-\phi_o$ is shown in FIG. 5. Any desired number of counter stages may be employed, and the maximum range of phase variation possible before an error results is $2^n\pi$ electrical radians, where $n$ is the number of counter stages employed. To achieve maximum linearity of the variation of average output $\overline{e}_\epsilon$ with phase difference, a counter design where all stages changing state do so approximately simultaneously is desirable. This is particularly important when up-down counting is occurring between 000 and 111, for example.

The counter shown in FIG. 5 meets the requirement just discussed for simultaneous changes of state by all stages. Two input lines are provided: one for up-count pulses at $X_1$, and one for down-count pulses at $X_6$. Simultaneous, or almost simultaneous, arrival of pulses on both lines is not permissible. As discussed above, gates $G_{11}$, $G_{12}$, and $G_{13}$ prevents such occurrence.

General logic rules govern the operation of the reversible counter in FIG. 5 are as follows:

(a) The state of the lowest-order stage $F_{21}$ will change whenever an up-count or a down-count pulse arrives.

(b) When an up-count pulse $X_i$ arrives, the state of any stage of order other than the lowest will change if, and only if, the state of every lower-order stage is true.

(c) When a down-count pulse $X_\delta$ arrives, the state of any stage of order other than the lowest will change if, and only if, the state of every lower-order stage is false.

As in other figures in the drawing, the semicircular blocks with a dot in the middle are and gates. Thus $G_{22}$, $G_{23}$, $G_{25}$ and $G_{26}$ are and gates. Also as in the other figure, the semicircular block with a plus sign are or gates. Thus, $G_{21}$, $G_{24}$ and $G_{27}$ are or gates. As described above, the flip flops $F_{21}$, $F_{22}$ and $F_{23}$ are simple T bistable flip flops which switch states upon receiving a clock pulse. These flip flops should have some internal delay between receiving the clock pulse and changing states. As set forth above, the amount of delay required depends on whether the flip flop is triggered by the leading or trailing edge of the flip flop.

$F_{21}$ represents the least significant bit of the binary counter 20 with $F_{23}$ being the most significant bit and $F_{22}$ next most significant bit. The outputs $X_0$, $X_1$, and $X_2$ supply the count of the device to be converted to an appropriate voltage such as illustrated in FIG. 2(f). A preset input $Y_b$ is employed to initially condition flip flops $F_{21}$, $F_{22}$ and $F_{23}$. Preferably the initial condition is 000 so that all the flip flops are false. When the initial state of the counter is 000 (that is when $F_{21}$, $F_{22}$ and $F_{23}$ are false) and a down-count pulse arrives, the counter will assume the state 111 that is $F_{21}$, $F_{22}$ and $F_{23}$ will be true). It follows that it is possible to interpret the most significant bit $F_{23}$ as representing the sign of the number in the counter, with a 1 in this position indicating a negative number, and with the magnitude of negative numbers being represented by the one's complement.

If the counter 20 shown in FIG. 5 is used for a reversible counter having a large number of stages, it is evident that the and gates associated with the highest order states will have a very large number of inputs. In such a case, a logic design is possible which is similar to that shown but which limits the size of the and gates required at some expense in operating synchronism.

The logic equations governing operation of the reversible counter shown in FIG. 5 are as follows:

$$_TF_{21} = G_{21} = X_\delta + X_1 \quad (14)$$
$$_TF_{22} = G_{24} = G_{22} + G_{23} \quad \text{Flip-flop input equations} \quad (15)$$
$$_TF_{23} = G_{27} = G_{25} + G_{26} \quad \text{(or gate equations)} \quad (16)$$

$$G_{22} = F_{21}X_1 \quad (17)$$
$$G_{23} = \overline{F_{21}}X_\delta \quad (18)$$
$$G_{25} = F_{21}F_{22}X_1 \quad \text{And Gate equations} \quad (19)$$
$$G_{26} = \overline{F_{21}}\overline{F_{22}}X_\delta \quad (20)$$

$$X_0 = F_{21} \quad (21)$$
$$X_1 = F_{22} \quad \text{Output equations} \quad (22)$$
$$X_2 = F_{23} \quad (23)$$

The symbols employed in these equations are similar to those for detector 10. By way of explanation, Equation 14 sets forth that the input to $F_{21}$ is the same as the input and output of or gate $G_{21}$ so that a pulse at either $X_\delta$ or $X_1$ will switch $F_{21}$. Equation 17 illustrates that there is no output from and gate 22 unless $F_{21}$ is true and there is an up-count pulse from $X_1$. Equation 18 illustrates there is no output from and gate 23 unless $F_{21}$ is false and there is a down-count pulse from $X_\delta$, etc. Thus, the outputs of counter 20 $X_0$, $X_1$ and $X_2$ are fed to a digital to analog converter 30 which is explained below.

An alternate reversible counter 50 is illustrated in FIG. 7. This counter will provide a cyclically varying output $\overline{e}_\epsilon$ with phase difference. In this alternate counter $F_{51}$ is the least significant bit, $F_{53}$ is the most significant bit and $F_{52}$ is the next most significant bit. The counter 50 is in this fashion binary weighted. These flip flops are T type described above. $G_{51}$, $G_{54}$ and $G_{57}$ are or gates while $G_{52}$, $G_{53}$, $G_{55}$, $G_{56}$, $G_{58}$ and $G_{59}$ are and gates. A preset P is employed on $F_{51}$, $F_{52}$ and $F_{53}$ to provide an initial condition.

The purpose of this counter 50 is to produce an average phase-difference voltage $\overline{e}_\epsilon$ which varies in a quantized linear manner with the phase-difference $\phi_\epsilon = \phi_1 - \phi_0$ for both positive and negative values of $\phi_\epsilon$, as in the case of the counter previously described, over a specified range of $\phi_\epsilon$. However, the counter to be described has the additional capability of producing a voltage $\overline{e}_\epsilon$ which is a piecewise linear function of $\phi_\epsilon$ such that $$\overline{e}_\epsilon = 0, \quad \phi_\epsilon = 2mn\pi \quad (23)$$

where $n$ is a positive integer determined by the design of the counter, and $m$ is any positive or negative integer, or zero. If the phase comparator is to be used as the error detector in a phase-comparison type angular-positioning servomechanism, $n$ may be chosen to equal the number of radians of electrical phase shift $p$ furnished by the output transducer for each radian of output-shaft motion. With such an arrangement, the output shaft will return to the position to which it has been commanded even after a disturbance torque greater than the output-torque capacity of the servomechanism has caused the output shaft to rotate any number of revolutions.

To achieve the above result, a step counter of sufficient capacity is gated to recycle in such a manner that the total number of counter states is $$S_s = p + 1, \quad (24)$$

where $p$ has the meaning stated in the preceding paragraph. As an example, let $p = 4$. A three-bit counter with eight possible states is then chosen to permit Relation (24) to be satisfied. The number of possible counter states is then reduced to five, as Relation (24) requires for this value of $p$, by appropriate gating. To avoid any undesirable effects which an unstable null between adjacent stable nulls might produce, two different sequences are chosen for upward and downward counting, respectively. The sequences chosen for this example are shown in the table below.

The counting sequences shown in the table are cyclic, and the last number in each column represents the beginning of another cycle. The table may be entered at any point. Any number of counts in either direction may result from an excessive disturbance torque.

COUNTING SEQUENCES OF THE THREE-BIT REVERSIBLE STEP COUNTER FOR CYCLICALLY VARYING OUTPUT $\overline{e}_\epsilon$ WITH PHASE DIFFERENCE $\phi_\epsilon$

| Upward Counting | Downward Counting |
|---|---|
| ... | ... |
| 000 | 000 |
| 001 | 111 |
| 010 | 110 |
| 111 | 001 |
| 000 | 000 |
| ... | ... |

Figure 6:
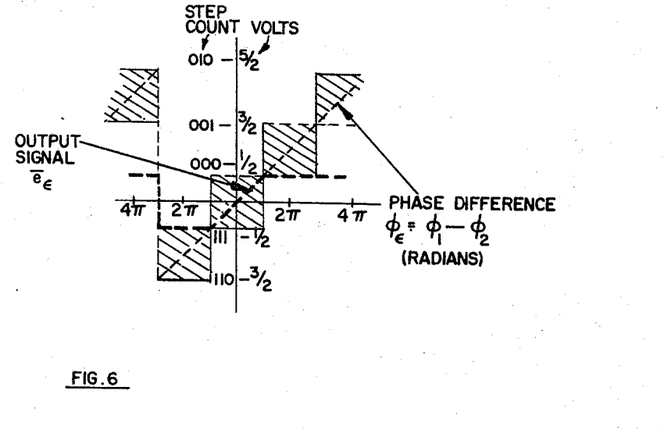
FIG. 6 illustrates a graph useful in explaining the invention.

FIG. 6 plots step count and the corresponding output voltage against the phase difference $\phi_\epsilon$. The numbers between which the reversible step counter will count for various value of phase difference $\phi_\epsilon$ are shown in FIG. 6. In this figure, the horizontal axis is cyclic, so that proceeding beyond the scale in either direction results in entry at the opposite end of the scale. To determine the average output voltage $\overline{e}_\epsilon$ which corresponds to a given value of $\phi_\epsilon$, reference should be made to the linear-operation curve, shown as a light dotted line; the limiting-operation curve shown as a heavy dotted line will be discussed later. It will be noted that the average output voltage $\bar{e}_\epsilon$ does not change between the largest positive value and the largest negative value when $\phi_\epsilon = n\pi$, i.e., at a point equidistant from adjacent stable nulls. The angle $\phi_t$ at which transition occurs approaches $n\pi$ more closely as $n$ increases.

The logic diagram of a three-bit reversible step counter for cyclically varying output $\bar{e}_\epsilon$ as a function of $\phi_\epsilon$ in a piecewise-linear manner is shown in FIG. 7. This logic diagram is similar to that shown in FIG. 5, except for the addition of gates $G_{58}$ and $G_{59}$ to introduce additional carry pulses into flip-flop $F_{53}$. Due to such a carry pulses, this counter counts upward from 010 to 111, rather than to 011. Similarly, it counts downwards from 110 to 001, rather than to 101. Otherwise, the counter counts normally, with the most significant bit representing the sign and with the amplitude of negative numbers represented in one's complement form. A negative sign is represented by a 1.

The logic equations governing operation of the reversible step counter shown in FIG. 7 are as follows:

$$_TF_{51} = G_{51} = X_1 + X_5 \quad \text{Flip-flop} \quad (25)$$
$$_TF_{52} = G_{54} = G_{52} + G_{53} \quad \text{input} \quad (26)$$
$$_TF_{53} = G_{57} = G_{55} + G_{56} + G_{58} + G_{59} \quad \text{equations} \quad (27)$$

$$G_{52} = F_{51} X_1 \quad (28)$$
$$G_{53} = \bar{F}_{51} X_5 \quad (29)$$
$$G_{55} = F_{51} F_{52} X_1 \quad (30)$$
$$G_{56} = \bar{F}_{51} \bar{F}_{52} X_5 \quad \text{And Gate equations} \quad (31)$$
$$G_{58} = \bar{F}_{51} F_{52} \bar{F}_{53} X_1 \quad (32)$$
$$G_{59} = \bar{F}_{51} F_{52} F_{53} X_5 \quad (33)$$

$$X_0 = F_{51} \quad (34)$$
$$X_1 = F_{52} \quad \text{Output equations} \quad (35)$$
$$X_2 = F_{53} \quad$$

The symbols above are similar to those employed above for counter 20.

The output of the cyclically varying counter 50 is labeled as $X_2$, $X_1$, and $X_0$ in FIG. 7. The flip-flops $F_{51}$, $F_{52}$ and $F_{53}$ have presets for P to set the flip flop in the preferred initial condition such as 000 discussed above. By so doing, the most significant bit gives the sign as described above.

*Digital-to-analog converter*

Figure 8:
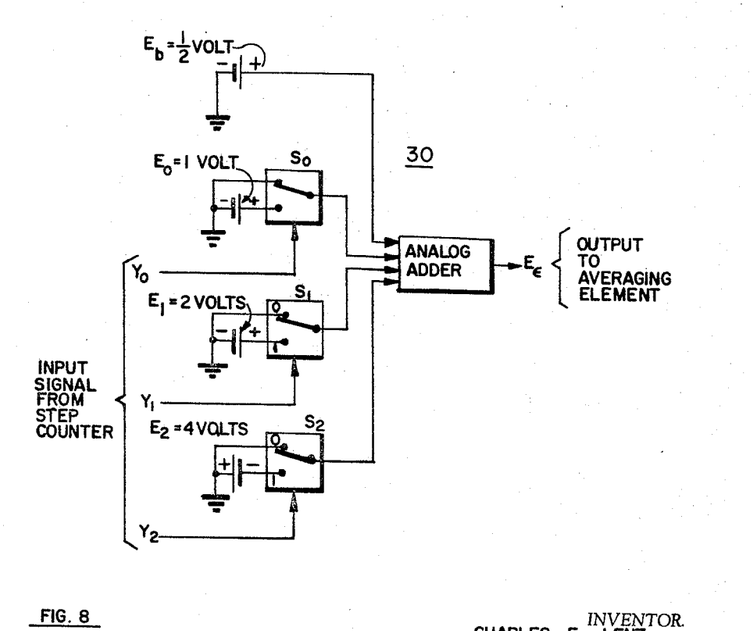
FIG. 8 illustrates a digital to analog converter which can be used in the comparator illustrated in FIG. 1.

The purpose of the digital-to-analog converter 30 is to produce an instantaneous output voltage $E_\epsilon$ corresponding to the instantaneous count $C_s$ in the step counter. The logic diagram for a digital-to-analog converter is shown in FIG. 8. The digital to analog converter 30 having inputs $Y_0$, $Y_1$ and $Y_2$. $X_0$ of co-center is shown in FIG. 8. The output 30 or 50 is connected to $Y_0$, $X_1$ is connected to $Y_1$ and $X_2$ is connected to $Y_2$. When any of the outputs $X_0$, $X_1$ or $X_2$ are "one" the corresponding transistor switch $S_0$, $S_1$, or $S_2$, respectively, connects a voltage source $E_0$, $E_1$ or $E_2$, respectively, to the input of an analog adder shown in block form. When any output $X_0$, $X_1$ or $X_2$ is zero, this input is grounded. In practice, other means may also be used to obtain $E_\epsilon$, such as switching resistance networks.

Two modes of operation will be discussed. In the first mode, the instantaneous output voltage $E_\epsilon$ varies linearly with the instantaneous step count $C_s$ over the entire operating range of the step counter. The second mode is similar, except that the absolute value of $E_\epsilon$ is limited to a magnitude no higher than some value $|E_\epsilon|$ maximum determined by the design of the phase comparator. These two modes of operation will be discussed separately.

*Linear conversion (shown in light dotted line in FIG. 6)*

The linear converter supplies an instantaneous output voltage in accordance with Formula 3, in column 3. For a three-bit digital-to-analog converter, the correspondence between step count and output voltage has already been shown in the table in column 3 with the constant $k_p = 1$ volt.

To implement this table, it is only necessary to connect the outputs of the step counter shown in either FIG. 5 or FIG. 7 to the inputs of the digital-to-analog converter in FIG. 8 in such a manner that $$Y_q = X_q, 0 \leq q \leq 2 \quad (37)$$

where $Y_q$ are inputs of 30 $X_q$ or outputs of counter 20 or 50. This relation is the logic equation for linear conversion. Reference voltages are assigned tthe values shown in FIG. 8, viz., $$E_b = \tfrac{1}{2} \text{ volt} \quad (38)$$
$$E_0 = 1 \text{ volt} \quad (39)$$
$$E_1 = 2 \text{ volts} \quad (40)$$
$$E_2 = -4 \text{ volts} \quad (41)$$

Connected in this manner, a three-bit step counter and digital-to-analog converter yield eight discrete voltage levels. A different number of levels can be obtained by varying the number of bits. The average voltage output $\bar{e}_\epsilon$ obtained from the step counter in FIG. 7 operating in this mode with the digital-to-analog converter in FIG. 8 is plotted as the piecewise-linear-operation curve shown in light dotted lines in FIG. 6 as a function of phase difference $\phi_\epsilon$.

*Limited conversion (shown in heavy dotted lines in FIG. 6)*

In digital-to-analog conversion with limiting, a maximum value is established beyond which the absolute value of $\bar{e}_\epsilon$ cannot rise. An example of such operation is shown by FIG. 6, where $$|\bar{e}_\epsilon| \leq \tfrac{1}{2} \text{ volt} \quad (42)$$

regardless of the value of the phase difference $\phi_\epsilon$. Such operation can be obtained with limiting at any desired level by placing a suitable network of logic gates between the outputs $X_q$ of the step counter (either that in FIG. 5 or that in FIG. 7, for example) and the inputs $Y_r$ of the digital-to-analog converter. However, when the output voltage $E_\epsilon$ is to assume only two values as shown in FIG. 6, a particularly simple method of limiting exists. To implement the type of operation shown in FIG. 6, it is merely necessary to connect the output of the step counter 20 or 50 to the input of the converter in FIG. 8 so that $$Y_0 = 0 \quad (43)$$
$$Y_1 = 0 \quad (44)$$
$$Y_2 = X_2 \quad (45)$$

and to assign the reference voltages in FIG. 8 the values $$E_b = \tfrac{1}{2} \text{ volt} \quad (46)$$
$$E_2 = -1 \text{ volt} \quad (47)$$

Thus the output voltage $E_\epsilon$ is controlled by only the sign of the step count. The voltage sources $E_0$ and $E_1$ and the switches $S_0$ and $S_1$ are not required in this case.

The output voltage $E_\epsilon$ is applied to averaging element 40 which smoothes the abruptly varying output of converter 30 to provide a voltage which varies continuously as a function of the instantaneous phase difference between $e_i$ and $e_0$. The manner in which this is accomplished will be more specifically described with reference to FIGS. 9(a)–9(f) and FIGS. 10(a)–10(f). In FIGS. 9(a)–9(f), it will be assumed that $e_i$ and $e_0$ are equal in frequency but 90° out of phase. In FIGS 10(a)–10(f) it will be assumed that there is a constant frequency difference between $e_i$ and $e_0$ which will result in a constantly increasing phase difference. Furthermore, in FIGS. 10(a)–10(f) it will be assumed that a step counter as is shown in FIG. 5 is used which maintains a count which varies monotonically with the phase difference $\phi_1 - \phi_0$.

Figure 9A:
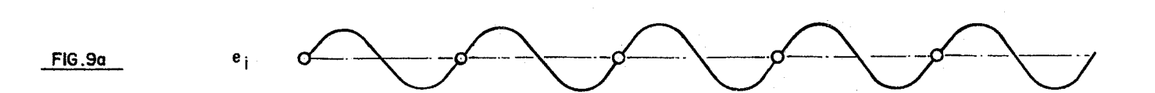
Figure 9B:
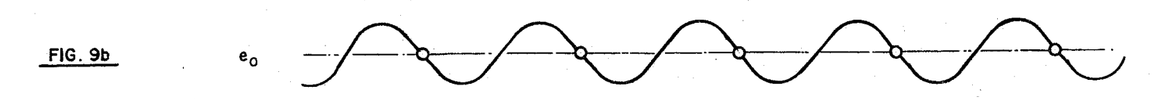
Figures 9C, 9D:
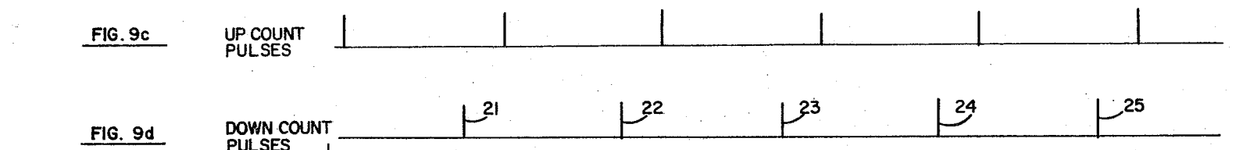
Figure 9E:
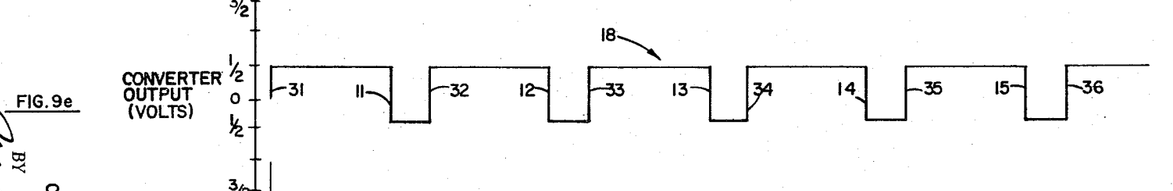
Figure 9F:
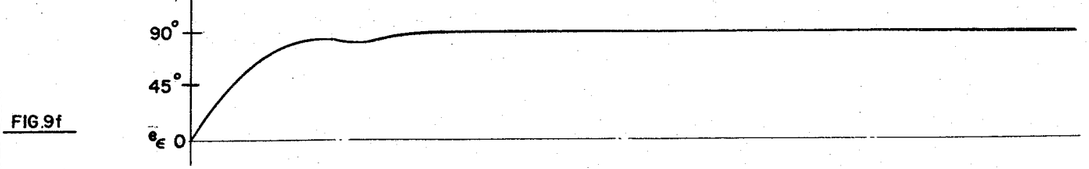

Referring now to the case where $e_i$ and $e_0$ are equal in frequency but 90° out of phase, the two input signals are shown in FIGS. 9(a) and 9(b). Each positive-slope zero crossing of $e_1$, indicated by a circle in FIG. 9(a), is converted to a positive pulse by digital step detector 10 as shown in FIG. 9(c). Each negative-slope zero crossing of $e_o$, indicated by a circle in FIG. 9(b), is converted to a positive pulse by digital step detector 10 as shown in FIG. 9(d). The two trains of pulses are then applied to reversible step counter 20 which is caused to add one count upon the application of a pulse at its up count input and subtract one count upon the application of a pulse at its down count input. The resultant digital signal from counter 20 is applied to digital-to-analog converter 30 which converts this signal to an analog voltage which varies between discrete voltage levels, as described previously, and which carries simultaneously with the change in the output of counter 20, i.e. upon the occurrence of an up count pulse or a down count pulse from detector 10. This operation is shown in FIG. 9(e). As can be seen from FIG. 9(e), and assuming that the phase of $e_1$ remains constant and only the phase of $e_o$ varies the position of edges 11–17 of waveform 18 follows the position of down count pulses 21–27 which indicate the negative-slope zero crossing of $e_o$. If $e_o$ and $e_1$ are in phase, edges 11–17 of waveform 18 will be exactly half way between edges 31–38, the positions of which remain constant if $e_1$ is constant, and the average or mean value of waveform 18 would be zero. However, since $e_1$ and $e_o$ are 90° out of phase, in the example shown, the edges 11–17 are shifted with respect to edges 31–38 and the average or mean value of waveform 18 assumes a value which is greater than zero. This value is directly proportional to the position of edges 11–17 which, in turn, is directly proportional to the phase shift between $e_o$ and $e_1$. As a result, the output of averaging element 40, shown in FIG. 9(f), reaches a steady state value which indicates the 90° phase shift between $e_1$ and $e_o$. In this manner, the output of averaging element 40 will indicate any incremental phase shift between $e_1$ and $e_o$ to any desired accuracy depending only on the frequency of the clock pulse input.

Figure 10A:
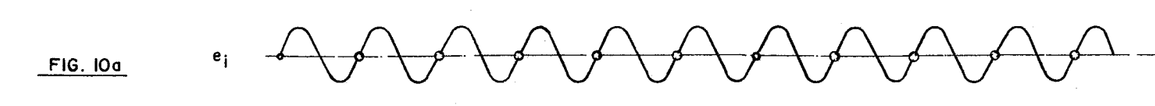
Figure 10B:
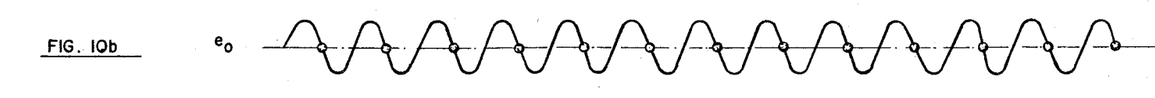
Figure 10C:
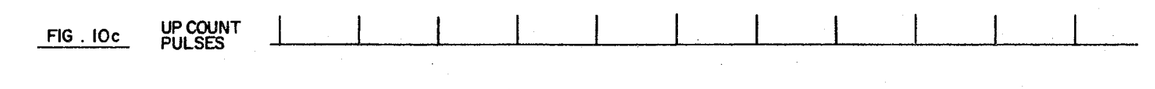
Figures 10D, 10E, 10F:
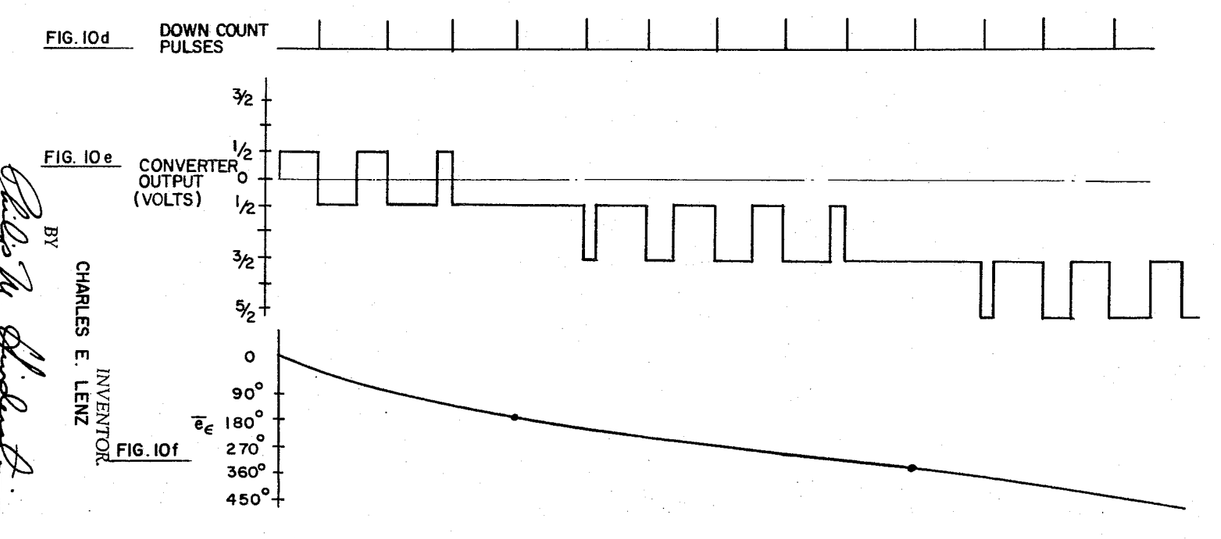

Referring now to the case where there is a constant frequency difference between $e_1$ and $e_o$, the two input signals are shown in FIGS. 10(a) and 10(b). In the same manner as described with reference to FIGS. 9(a)–9(f), two trains of pulses are derived, as shown in FIGS. 10(c) and 10(d), and applied to counter 20, which, in turn, controls the operation of digital to analog converter 30, the output of which is shown in FIG. 10(e). As can be readily seen from an inspection of FIGS. 10(c) to 10(e), the slightly greater frequency of $e_o$ as compared with $e_1$ causes the converter output to gradually assume a greater and greater negative value. The average or mean value of the converter 30 output, as shown in FIG. 10(f), will also increase gradually and at a rate which is directly proportional to the frequency difference between $e_1$ and $e_o$. As a result, the value of $\bar{e}_\epsilon$ at any given time is equal to the instantaneous phase shift between $e_1$ and $e_o$.

Although only a preferred embodiment of the present invention has been described herein, it is not intended that the invention be restricted thereto, but that it be limited only by the true spirit and scope of the appended claims.

I claim:
1. A phase comparator for producing an output signal representative of the instantaneous phase difference between a first and a second periodically varying signal comprising:
   means responsive to a predetermined point in each cycle of said first signal for producing a third signal;
   means responsive to a predetermined point in each cycle of said second signal for producing a fourth signal;
   means responsive to said third signal and said fourth signal for producing a fifth signal, the amplitude of said fifth signal being capable of variation between at least three discrete levels, the amplitude of said fifth signal increasing to the next higher level upon the occurrence of said third signal and decreasing to the next lower level upon the occurrence of said fourth signal; and
   means responsive to the mean value of said fifth signal for providing said output signal as a function thereof.
2. The phase comparator of claim 1 further comprising:
   means for preventing application of said third and fourth signals to said means for producing a fifth signal when said third and fourth signals occur simultaneously.
3. The phase comparator of claim 1 wherein said means for providing said output signal comprises:
   an averaging element for smoothing said voltage to provide a continuous signal indicative of said phase difference.
4. A phase comparator for producing an output signal representative of the instantaneous phase difference between a first and a second periodically varying signal comprising:
   means responsive to a predetermined point in each cycle of said first signal for producing a pulse so as to form a first pulse train;
   means responsive to a predetermined point in each cycle of said second signal for producing a pulse so as to form a second pulse train;
   means responsive to said first and second pulse trains for producing a third signal, the amplitude of said third signal being capable of variation between at least three discrete levels, the amplitude of said third signal increasing to the next higher level upon the occurrence of a pulse from said first pulse train and decreasing to the next lower level upon the occurrence of a pulse from said second pulse train; and
   means responsive to the mean value of said third signal for providing said output signal as a function thereof.
5. The phase comparator of claim 4 further comprising:
   means for preventing application of said first and second pulse trains to said means for producing a third signal when a pulse in said first pulse train and a pulse in said second pulse train occur simultaneously.
6. The phase comparator of claim 4 wherein said means for producing a third signal comprises:
   a reversible counter having an up-count input responsive to said first pulse train and a down-count input responsive to said second pulse train; and
   a digital-to-analog converter coupled to said counter for producing said third signal which varies as a function of the count in said counter.
7. The phase comparator of claim 6 wherein said reversible counter comprises:
   a plurality of stages for providing a multiple-bit digital signal representing the instantaneous count in said counter and wherein the most significant bit of said digital signal indicates the sign of said count.
8. The phase comparator of claim 6 further comprising:
   means to preset said counter to zero.
9. The phase comparator of claim 6 wherein said digital-to-analog converter comprises:
   a plurality of voltage sources;
   switch means coupled to said plurality of voltage sources and responsive to said count in said counter for selecting individual ones of said voltage sources to produce a composite voltage which varies between a plurality of discrete voltage levels, said switch means operative to increase said composite voltage when said count increases and decrease said composite voltage when said count decreases.
10. The phase comparator of claim 9 wherein said means for providing said output signal comprises:
    an averaging element for smoothing said composite voltage to provide a continuous signal indicative of said phase difference.

References Cited

UNITED STATES PATENTS

| | | | |
|---|---|---|---|
| 2,806,295 | 9/1957 | Ball. | |
| 2,887,416 | 3/1959 | Grisdale | 324—83 |
| 2,911,641 | 11/1959 | Kohler. | |
| 2,933,682 | 4/1960 | Moulton et al. | 324—79 |
| 3,069,623 | 12/1962 | Murgio | 324—79 X |
| 3,187,195 | 6/1965 | Stefanov. | |
| 3,211,993 | 10/1965 | Golden et al. | 324—83 X |
| 3,271,675 | 9/1966 | Kreinberg | 324—83 |

RUDOLPH V. ROLINEC, *Primary Examiner.*

WALTER L. CARLSON, *Examiner.*

P. F. WILLE, *Assistant Examiner.*